(12) United States Patent
Podnar

(10) Patent No.: US 9,953,403 B2
(45) Date of Patent: Apr. 24, 2018

(54) STEREOSCOPIC CAMERA AND ASSOCIATED METHOD OF VARYING A SCALE OF A STEREOSCOPIC IMAGE PAIR

(71) Applicant: The Boeing Company, Chicago, IL (US)

(72) Inventor: Gregg W. Podnar, Seattle, WA (US)

(73) Assignee: The Boeing Company, Chicago, IL (US)

(*) Notice: Subject to any disclaimer, the term of this patent is extended or adjusted under 35 U.S.C. 154(b) by 133 days.

(21) Appl. No.: 15/179,542

(22) Filed: Jun. 10, 2016

(65) Prior Publication Data

US 2017/0358062 A1 Dec. 14, 2017

(51) Int. Cl.
| | |
|---|---|
| *H04N 13/02* | (2006.01) |
| *G06T 5/00* | (2006.01) |
| *H04N 5/225* | (2006.01) |
| *G02B 7/02* | (2006.01) |
| *H04N 7/18* | (2006.01) |

(52) U.S. Cl.
CPC .............. *G06T 5/006* (2013.01); *G02B 7/023* (2013.01); *H04N 5/2253* (2013.01); *H04N 5/2254* (2013.01); *H04N 7/183* (2013.01); *H04N 13/0239* (2013.01); *H04N 13/0296* (2013.01)

(58) Field of Classification Search
CPC .... H04N 5/2253; H04N 5/2254; H04N 7/183; H04N 13/0239; H04N 13/0296; G06T 5/006; G02B 7/023
USPC .................. 348/49, 42, 47, 48, 50; 359/462; 396/324, 326
IPC ...................................................... H04N 13/02
See application file for complete search history.

(56) References Cited

U.S. PATENT DOCUMENTS

| | | | |
|---|---|---|---|
| 2010/0231691 A1* | 9/2010 | Lee ..................... | H04N 5/23212 348/47 |
| 2014/0098195 A1* | 4/2014 | Pace .................. | H04N 13/0242 348/47 |

OTHER PUBLICATIONS

Sethuraman, Sriram; "Stereoscopic Image Sequence Compression Using Multiresolution and Quadtree Decomposition Based Disparity-and Motion-Adaptive Segementation"; A Dissertation Submitted to the Graduate School in Partial Fulfillment of the Requirements; Pittsburgh, Pennsylvania; Jul. 1996; pp. 1-138.
Geometry of Binocular Imaging [online] [retreived Dec. 6, 2016]. Retrieved from the Internet: <URL:http:https://www.ri.cmu.edu/pub_files/pub1/grinberg_v_s_1994_1/grinberg_v_s_1994_1.pdf>. 9 pages.

(Continued)

*Primary Examiner* — Sherrie Hsia
(74) *Attorney, Agent, or Firm* — Alston & Bird LLP

(57) ABSTRACT

A stereoscopic camera and associated method for capturing a stereoscopic image pair are provided. As an example, a stereoscopic camera includes first and second lenses defining parallel optical axes. The stereoscopic camera also includes first and second image sensors for receiving optical signals from the first and second lenses. The first and second fields of view are defined so as to overlap to define a first area of coincidence when the first and second lenses are spaced apart by a first distance. The first and second lenses are configured to be repositioned to be spaced apart by a second distance with the first and second image sensors being correspondingly repositioned to alter a space therebetween such that the first and second fields of view overlap to define a second area of coincidence when the first and second lenses are spaced apart by the second distance.

30 Claims, 10 Drawing Sheets

(56) References Cited

OTHER PUBLICATIONS

Dashwood Cinema Solutions, A Beginner's Guide to Shooting Stereoscopic 3D, News [online] [retrieved Dec. 6, 2016]. Retrieved from the Internet: <URL:http://www.dashwood3d.com/blog/beginners-guide-to-shooting-stereoscopic-3d/>. 16 pages.

Stereoscopic Filming [online] [retrieved Dec. 6, 2016]. Retrieved from the Internet: <URL:http://paulbourke.net/stereographics/stereo_film/>. (dated Oct. 2008) 11 pages.

3D Concepts: 3D Digital Cameras; The 3D Advantage; [online] [retrieved Dec. 6, 2016]. Retrieved from the Internet: <URL:http://www.stereoscopy.com/3d-concepts/cameradig.html>. 8 pages.

UrbanFox.TV Blog: 3D rigs provide Alterna-tive views [online] [retrieved Dec. 6, 2016]. Retrieved from the Internet: <URL:http://urbanfoxtv.blogspot.com/2010/07/3d-rigs-provide-alterna-tive-views.html>. (dated Jul. 20, 2010) 7 pages.

\* cited by examiner

STEREOSCOPIC CAMERA AND ASSOCIATED METHOD OF VARYING A SCALE OF A STEREOSCOPIC IMAGE PAIR

CROSS REFERENCE TO RELATED APPLICATIONS

The present application relates to U.S. patent applications entitled "Multi-Tread Vehicles and Methods of Operating Thereof" and "Remotely Controlling Robotic Platforms Based on Multi-Modal Sensory Data", both of which are filed concurrently herewith and both of which are incorporated herein by reference in their entirety.

TECHNOLOGICAL FIELD

A stereoscopic camera and an associated method of capturing a stereoscopic image pair are provided and, more particularly, a stereoscopic camera and an associated method of varying the scale of the stereoscopic image pair are provided in accordance with an example embodiment.

BACKGROUND

Visual telepresence relies upon a capture of an image of a first location and the provision of the image to a user at a second location for review. In many instances, the first location is remote from the second location of the user. Upon review of the image, the user may take various actions including inspection of a workpiece assembled or otherwise fabricated at the remote location, monitoring of the operations occurring at the remote location or manipulation of a robot, end effector or other device at the remote location in order to perform various operations at the remote location. For example, the user may rely upon the image in order to navigate or position an object at the remote location, such as by repositioning the camera that captures the image.

Some of the actions supported by visual telepresence require significant fidelity for the operator to have a sufficient feeling of presence at the remote location, such as those actions that involve the inspection of a workpiece or the monitoring of the operations occurring within a remote confined workspace. However, the images captured of the remote location may not provide sufficient information or be of sufficient quality to permit a user located remotely to perform the desired actions with the necessary precision. In this regard, images may be captured by a monoscopic viewing system. However, monoscopic viewing systems do not provide binocular depth cues to the user that are desired in at least some instances in order to permit the user to perform the requisite actions with the desired precision.

Alternatively, the images of the remote location may be captured by a stereoscopic image system. Stereoscopic image systems include a pair of cameras that capture a stereoscopic image pair and may provide binocular depth cues for the users. However, stereoscopic image systems generally position the two cameras so as to be toed-in as shown in FIG. 1. In this regard, the optical axes defined by the two cameras converge and cross one another. Due to the toed-in configuration of the cameras, the cameras of stereoscopic image systems generally have non-parallel fields of view. As a result, the images displayed suffer from geometric distortion, such as keystone distortion, as shown in FIG. 2 with different keystone-shaped images presented for the left eye view and the right eye view. This geometric distortion created by stereoscopic image systems may reduce the operator's feeling of presence at the remote location and may increase the difficulty associated with user's reliance upon the image in order to remotely perform various actions with the desired precision and, in some instances, may cause nausea, fatigue, and/or visual phoria.

BRIEF SUMMARY

A stereoscopic camera and associated method for capturing a stereoscopic image pair are provided to support various applications including visual telepresence for, for example, supporting navigation or positioning of an object at a remote location or the performance of various actions, e.g., manipulation tasks, at a remote location. The stereoscopic camera and associated method of capturing a stereoscopic image pair are configured so as to reduce or eliminate geometric distortions in the resulting stereoscopic image pair, thereby providing binocular depth cues while reducing the risk of fatigue, nausea and/or visual phoria. Further, the stereoscopic camera and associated method of capturing a stereoscopic image pair are configured to permit the scale of the stereoscopic image pair to be adjusted, such as by being enlarged or reduced, while maintaining the geometrical relationship between the cameras and the image sensors in order to continue to reduce or eliminate geometric distortions in the stereoscopic image pair, thereby improving the ability to perform various tasks via visual telepresence.

In an example embodiment, a stereoscopic camera is provided that includes first and second lenses defining respective optical axes. The optical axis of the first lens is parallel to the optical axis of the second lens. The stereoscopic camera also includes first and second image sensors configured to receive optical signals from the first and second lenses, respectively. The first and second image sensors of this example embodiment are coplanar and perpendicular to the optical axis of the respective lens. The first lens and the first image sensor define a first field of view and the second lens and the second image sensor define a second field of view. The first and second fields of view overlap to define a first area of coincidence in an instance in which the first and second lenses are spaced apart by a first distance. The first and second lenses are configured to be repositioned so as to be spaced apart by a second distance, different than the first distance. The first and second image sensors are configured to be correspondingly repositioned to alter a space therebetween such that the first and second fields of view overlap to define a second area of coincidence in an instance in which the first and second lenses are spaced apart by the second distance.

The first and second lenses and the first and second image sensors are configured in accordance with an example embodiment to be repositioned such that a distance between the optical axis of the first lens and the center of the first image sensor remains the same and a distance between the optical axis of the second lens and the center of the second image sensor remains the same while the first and second lenses are spaced apart by the first distance and by the second distance. The stereoscopic camera of an example embodiment also includes one or more rails upon which the first and second lenses are slidably mounted. The first and second lenses are configured in this example embodiment to be slidably repositioned along the one or more rails so as to be spaced apart by the first and second distances while maintaining a parallel relationship of the optical axes. The one or more rails of an example embodiment includes a plurality of rails extending in parallel with one another. In this example embodiment, the first and second image sensors are slidably mounted upon one or more of the rails and are configured to be slidably repositioned in concert with the first and second lenses, respectively. The stereoscopic camera of this example embodiment also includes a motor configured to slidably reposition the first and second lenses along the one or more rails.

In another example embodiment, a stereoscopic camera is provided that includes first and second lenses defining respective optical axes. The optical axis of the first lens is parallel to the optical axis of the second lens. The stereoscopic camera of this example embodiment also includes at least one image sensor configured to receive optical signals from the first and second lenses. The first lens and the at least one image sensor define a first field of view, while the second lens and the second image sensor define a second field of view. The first and second fields of view overlap to define a first area of coincidence in an instance in which the first and second lenses are spaced apart by a first distance. The first and second lenses are configured to be repositioned so as to be spaced apart by a second distance, different than the first distance. In addition, a distance between the optical axis of the first lens and a center of that portion of the at least one image sensor that receives the optical signals from the first lens remains the same and a distance between the optical axis of the second lens and a center of that portion of the at least one image sensor that receives the optical signals from the second lens remains the same while the first and second lenses are spaced apart by the first distance and by the second distance. As such, the first and second fields of view overlap to define a second area of coincidence in an instance in which the first and second lenses are spaced apart by the second distance.

The at least one image sensor of an example embodiment includes a single image sensor having first and second portions for receiving optical signals from the first and second lenses, respectively. In this example embodiment, the at least one image sensor is configured to reposition the first and second portions in response to repositioning of the first and second lenses such that the distance between the optical axis of the first lens and the center of the first portion of the image sensor remains the same and the distance between the optical axis of the second lens and the center of the second portion of the image sensor remains the same while the first and second lenses are spaced apart by the first distance and by the second distance.

The at least one image sensor of another example embodiment includes first and second image sensors that are configured to be correspondingly repositioned to alter a spacing therebetween in response to repositioning the first and second lenses. In this example embodiment, the first and second image sensors are coplanar. The stereoscopic camera of an example embodiment also includes a display configured to present alternating perspectives of overlapping images captured by the first and second image sensors of the first and second fields of view, respectively, to respective eyes of a viewer.

The stereoscopic camera of an example embodiment further include one or more rails upon which the first and second lenses are slidably mounted. In this regard, the first and second lenses are configured to be slidably repositioned along the one or more rails so as to be spaced apart by the first and second distances while maintaining a parallel relationship between the optical axes. The stereoscopic camera of this example embodiment further includes a motor configured to slidably reposition the first and second lenses along the one or more rails.

In a further example embodiment, a stereoscopic camera is provided that includes first and second lenses defining respective optical axes and having respective fields of view. The optical axis of the first lens is parallel to the optical axis of the second lens. The stereoscopic camera of this example embodiment also includes first and second image sensors configured to receive optical signals from the first and second lenses, respectively. The first and second image sensors are coplanar and perpendicular to the optical axis of the respective lens. The stereoscopic camera of this example embodiment further includes a controller configured to cause the first and second lenses to be repositioned such that the optical axes of the first and second lenses are spaced apart by a different distance while maintaining a parallel relationship of the optical axes of the first and second lenses.

The stereoscopic camera of an example embodiment further includes one or more rails upon which the first and second lenses are slidably mounted. The first and second lenses are configured to be slidably repositioned along the one or more rails so as to be spaced apart by a different distance while maintaining the parallel relationship of the optical axes. The one or more rails of an example embodiment include a plurality of rails extending in parallel with one another. In this regard, the first and second image sensors are slidably mounted upon one or more of the rails and are configured to be slidably repositioned in concert with the first and second lenses, respectively.

The first and second image sensors of an example embodiment are configured to be correspondingly repositioned to alter a spacing therebetween based upon the repositioning of the first and second lenses. The stereoscopic camera of an example embodiment also includes a motor configured to reposition the first and second lenses. In an example embodiment, the first lens and the first image sensor define the first field of view and the second lens and the second image sensor define the second field of vie w. In this regard, the first and second fields of view overlap to define a first area of coincidence in an instance in which the first and second lenses are spaced apart a first distance. The first and second lenses of this example embodiment are configured to be repositioned so as to be spaced apart by a second distance, different from the first distance. In this regard, the first and second image sensors are configured to be correspondingly repositioned to alter a spacing therebetween such that the first and second fields of view overlap to define a second area of coincidence in an instance in which the first and second lenses are spaced apart by the second distance. In an example embodiment, a distance between the optical axis of the first lens and the center of the first image sensor remains the same and the distance between the optical axis of the second lens and the center of the second image sensor remains the same while the first and second lenses are spaced apart by the first distance and by the second distance.

In yet another example embodiment, a method of varying a scale of a stereoscopic image pair is provided. The method includes capturing a first stereoscopic image pair at a first scale of at least one image sensor based upon optical signals received from first and second lenses that are spaced apart by a first distance. The first and second lenses define respective optical axes with the optical axis of the first lens parallel to the optical axis of the second lens. The method of this example embodiment also includes repositioning the first and second lenses so as to be spaced apart by a second distance, different than the first distance, while maintaining a parallel relationship of the optical axes of the first and second lenses. The method of this example embodiment also includes capturing a second stereoscopic image pair at a second scale, different than the first scale, while the first and second lenses are space apart by the second distance.

In an example embodiment, the first lens and the at least one image sensor define a first field of view and the second lens and the at least one image sensor define a second field of view. The first and second fields of view overlap to define a first area of coincidence in an instance in which the first and second lenses are spaced apart by the first distance. A distance between the optical axis of the first lens and the center of that portion of the at least one image sensor that receives the optical signals from the first lens remains the same and the distance between the optical axis of the second lens and the center of that portion of the at least one image sensor that receives the optical signals from the second lens remains the same while the first and second lens are spaced apart by the first distance and by the second distance. As such, the first and second fields of view overlap to define a second area of coincidence in an instance in which the first and second lenses are spaced apart by the second distance.

In an example embodiment, the second scale is enlarged relative to the first scale with the method further including providing control over an object based upon the second stereoscopic image pair at the second scale. In this regard, the method of an example embodiment provides control by controlling a position of the object from a remote location based upon the second stereoscopic image pair at the second scale. In another example embodiment, the second scale is reduced relative to the first scale with the method further including providing control over an object based upon the second stereoscopic image pair at the second scale. In an example embodiment, the method repositioned so first and second lenses by slidably repositioning the first and second lenses along one or more rails upon which the first and second lenses are slidably mounted so as to be spaced apart by a different distance while maintaining a parallel relationship of the optical axes. In an embodiment in which the at least one image sensor includes first and second image sensors, the method also includes correspondingly repositioning the first and second image sensors to alter a spacing therebetween in response to repositioning the first and second lenses.

BRIEF DESCRIPTION OF THE DRAWINGS

Figure 1:
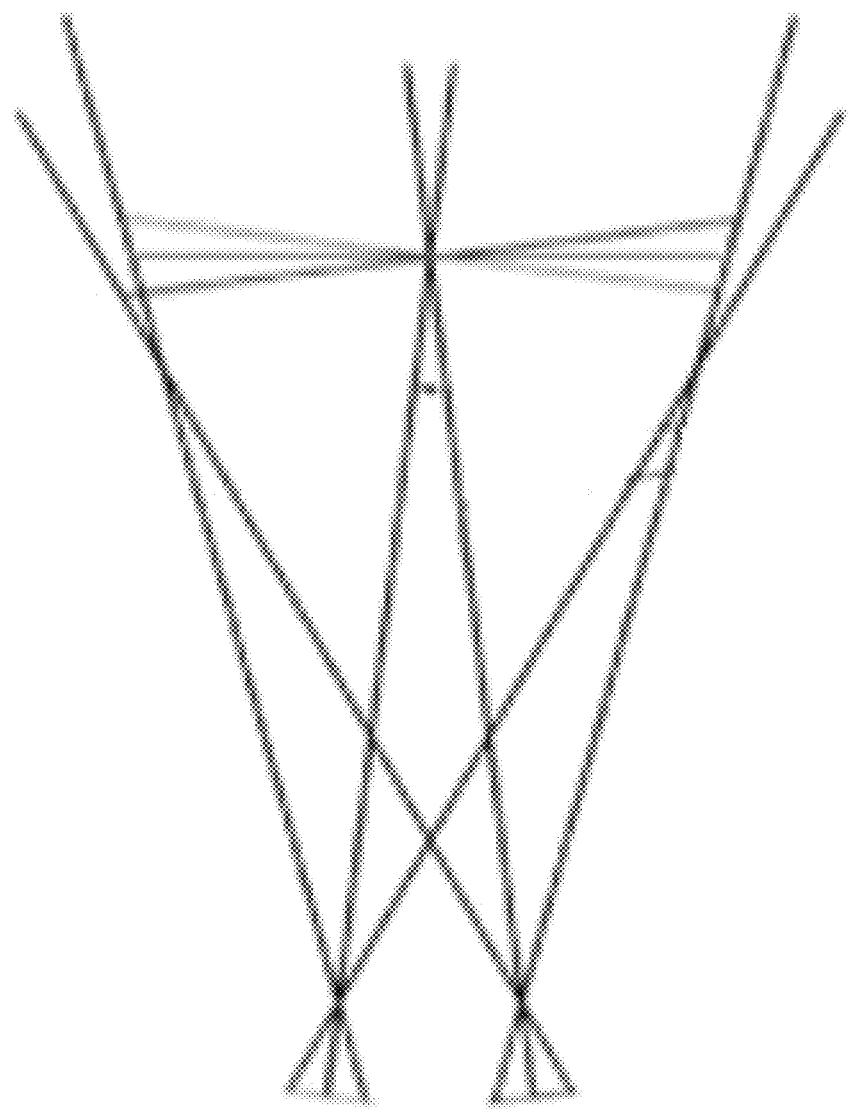
Figure 2:
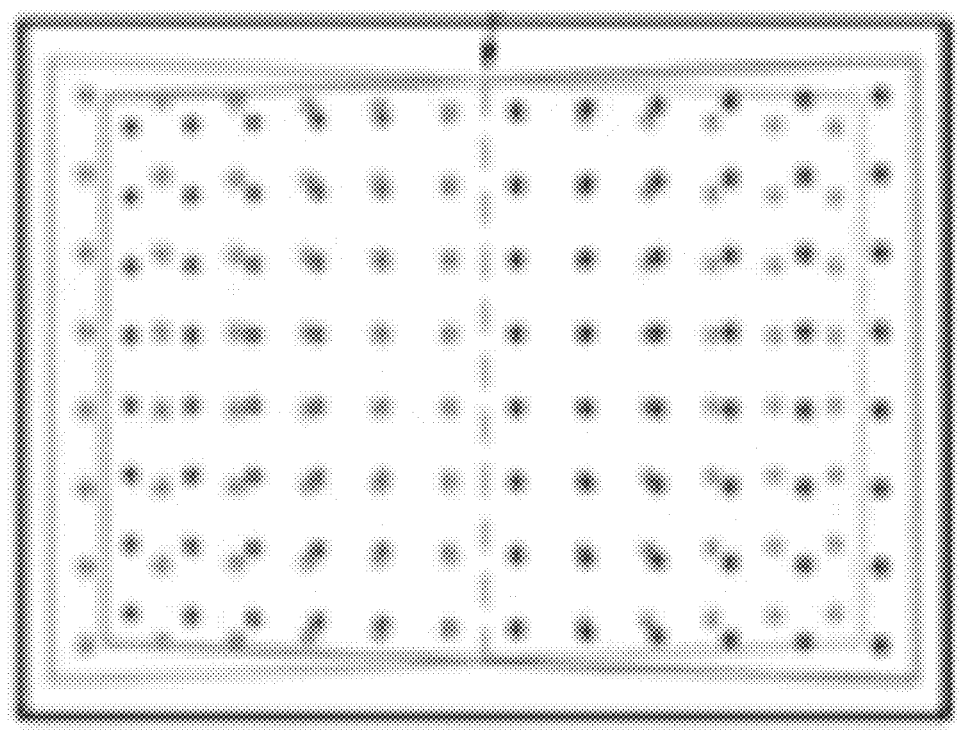
Figure 3:
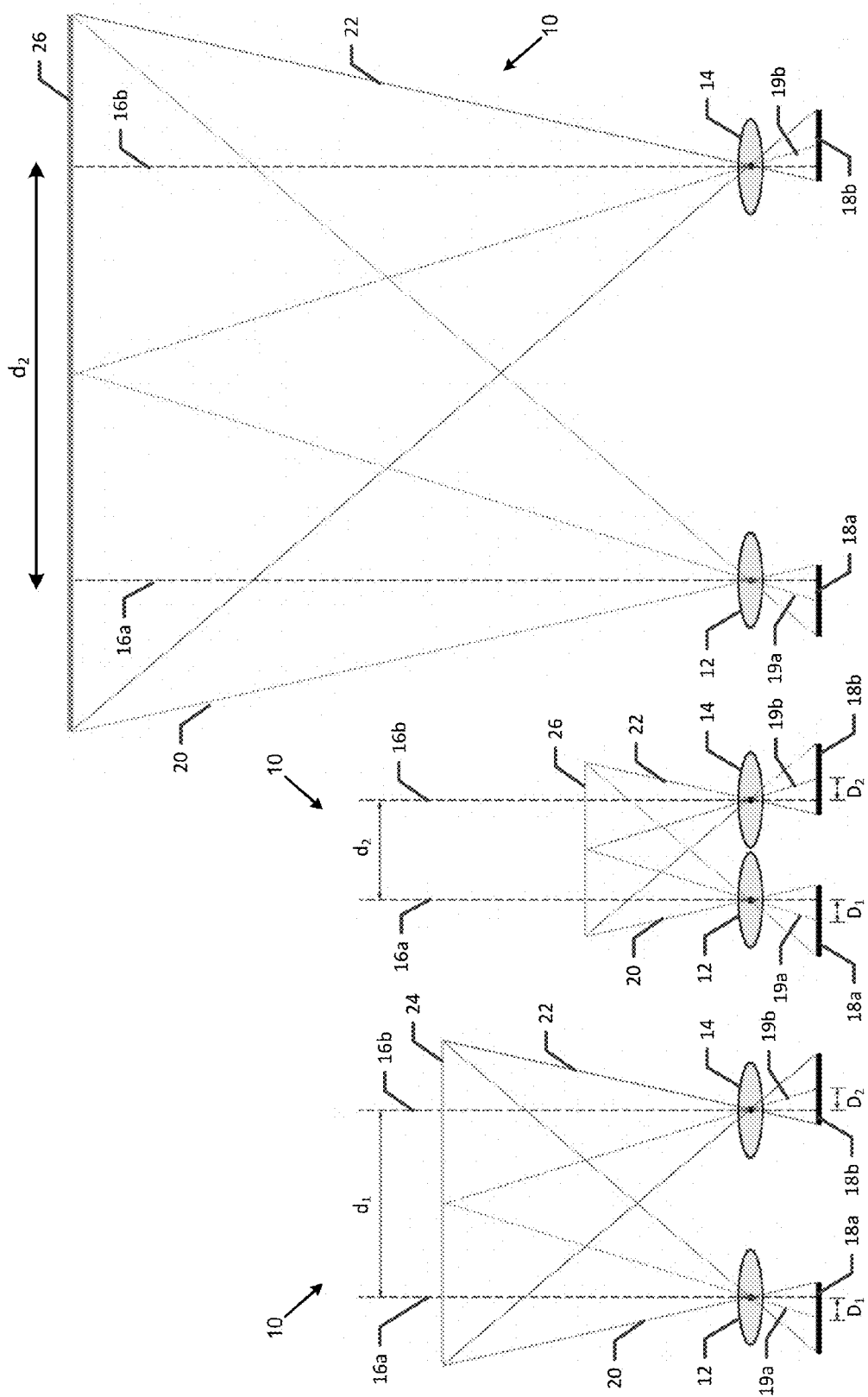
Figure 4:
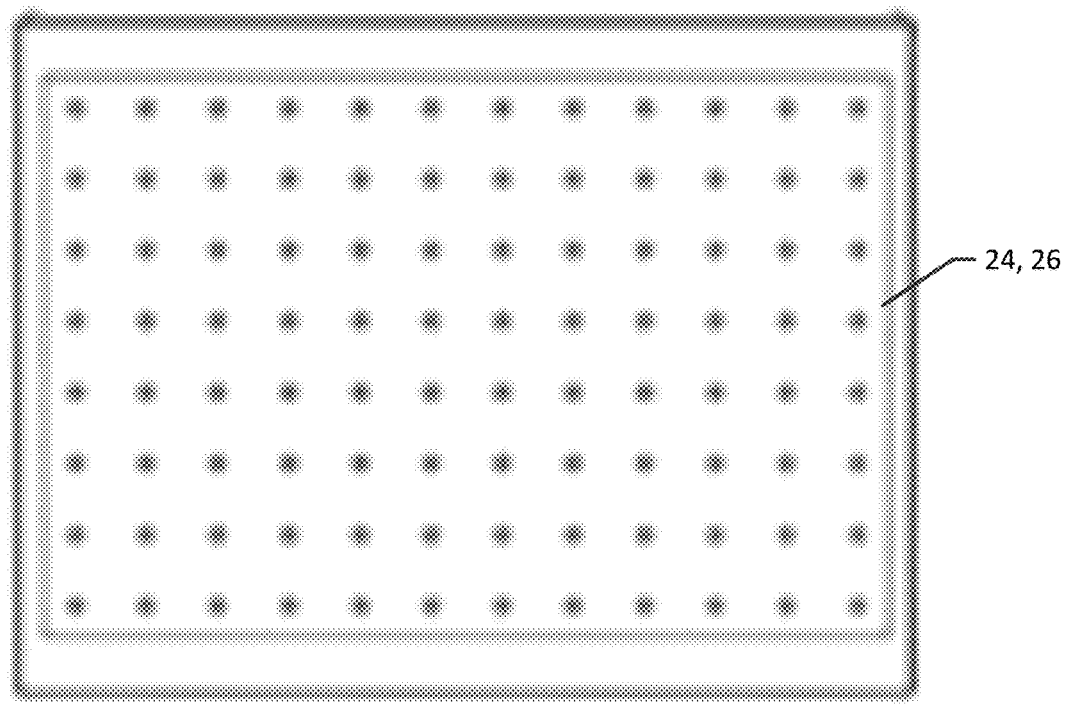
Figure 7:
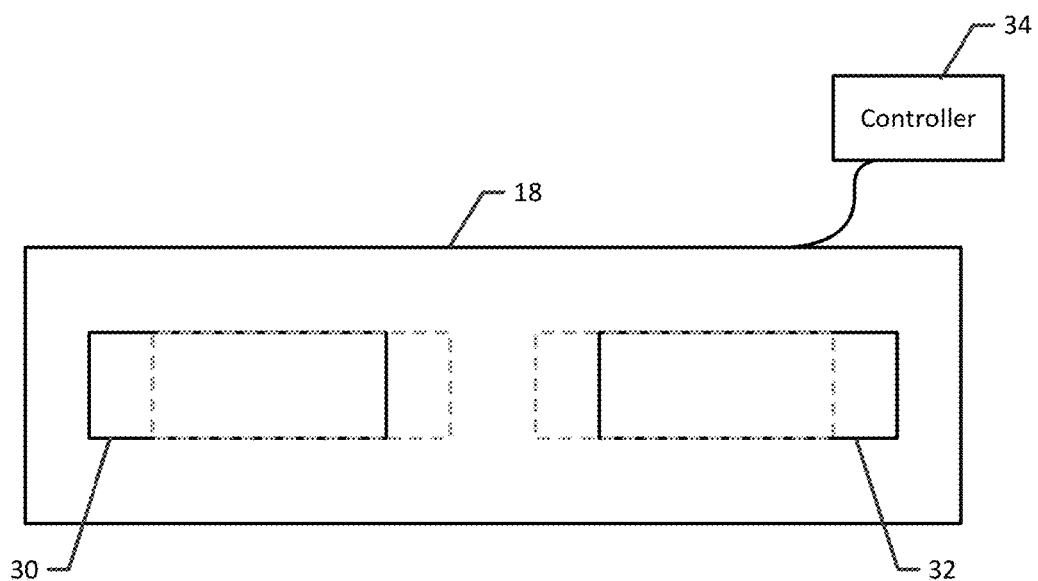
Figure 8:
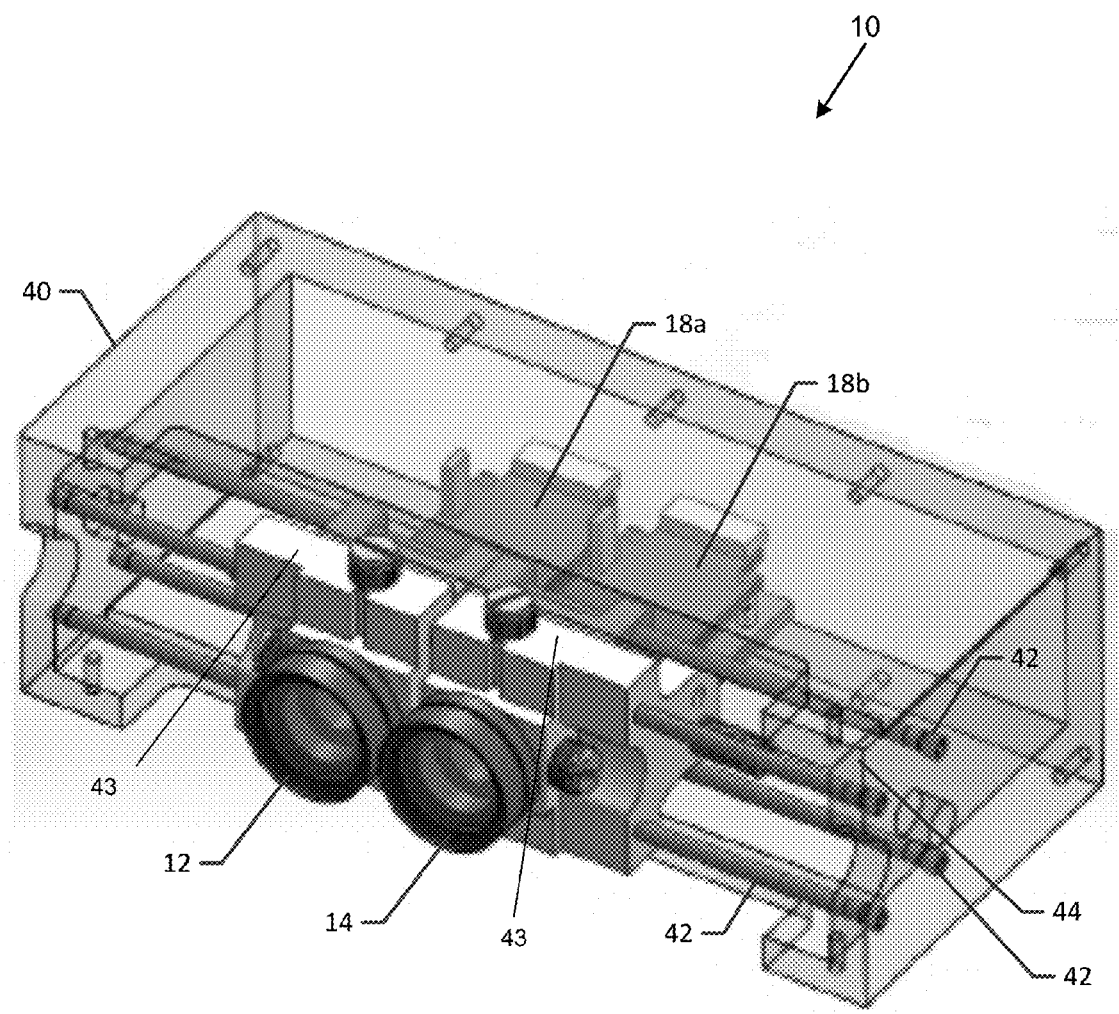
Figure 9:
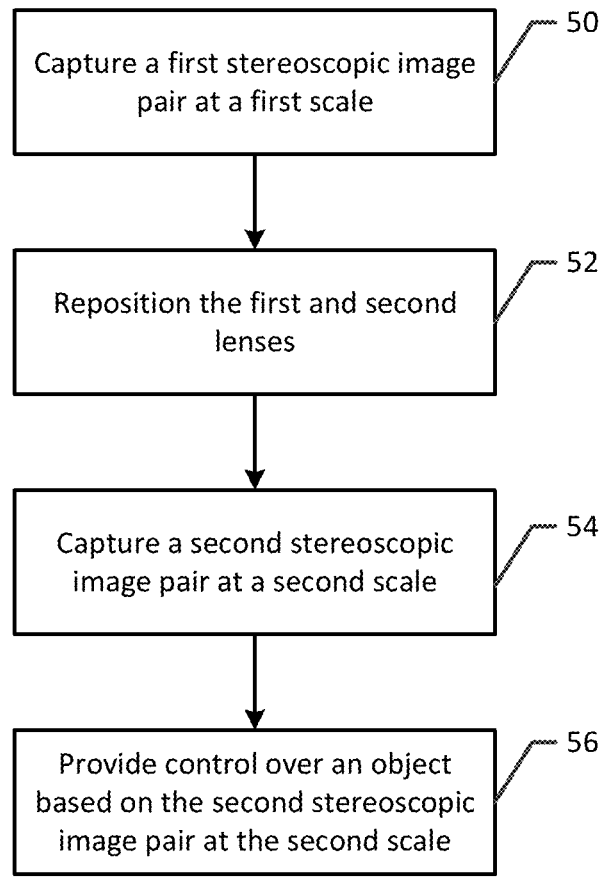
Figure 10:
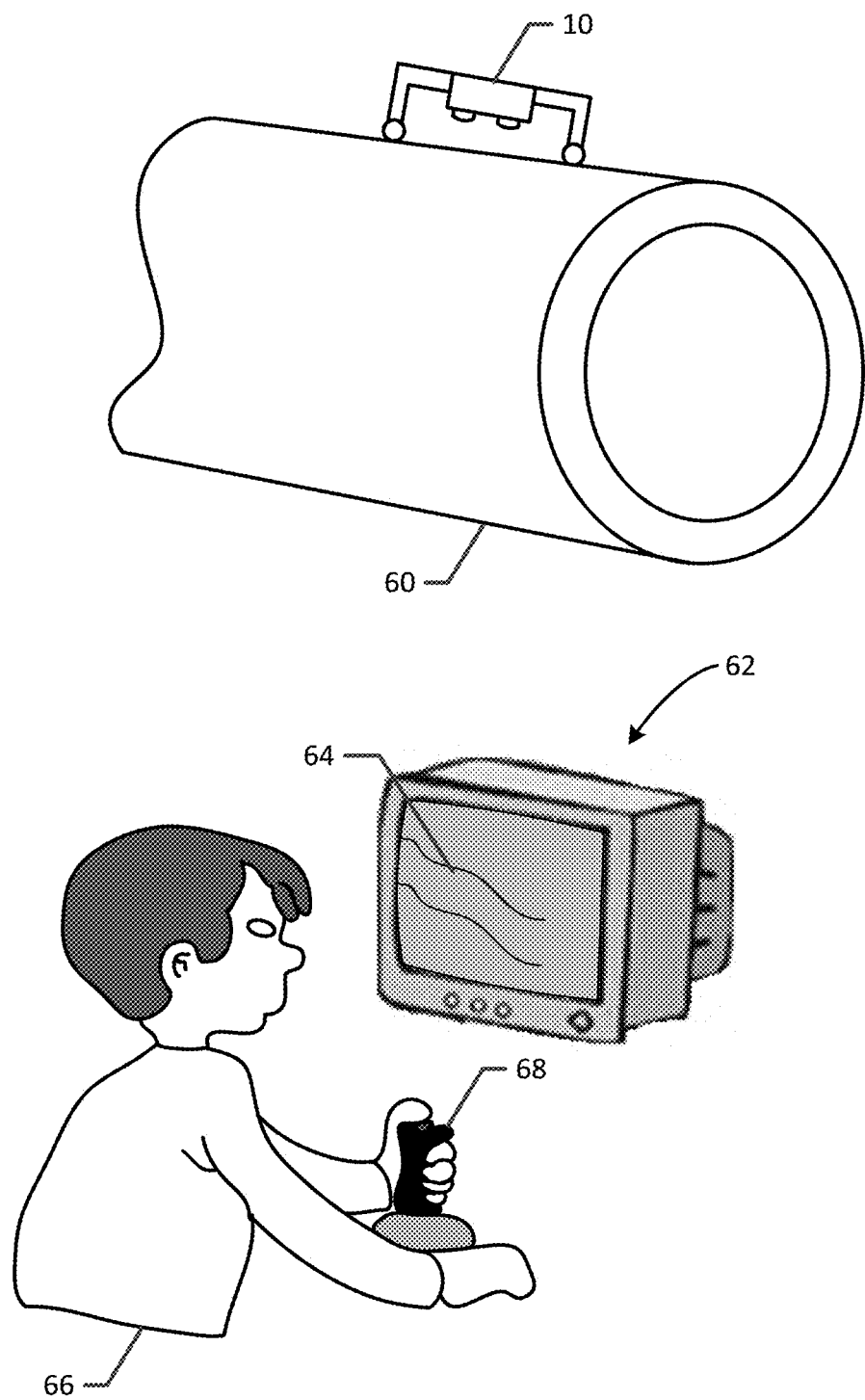
Figure 11:
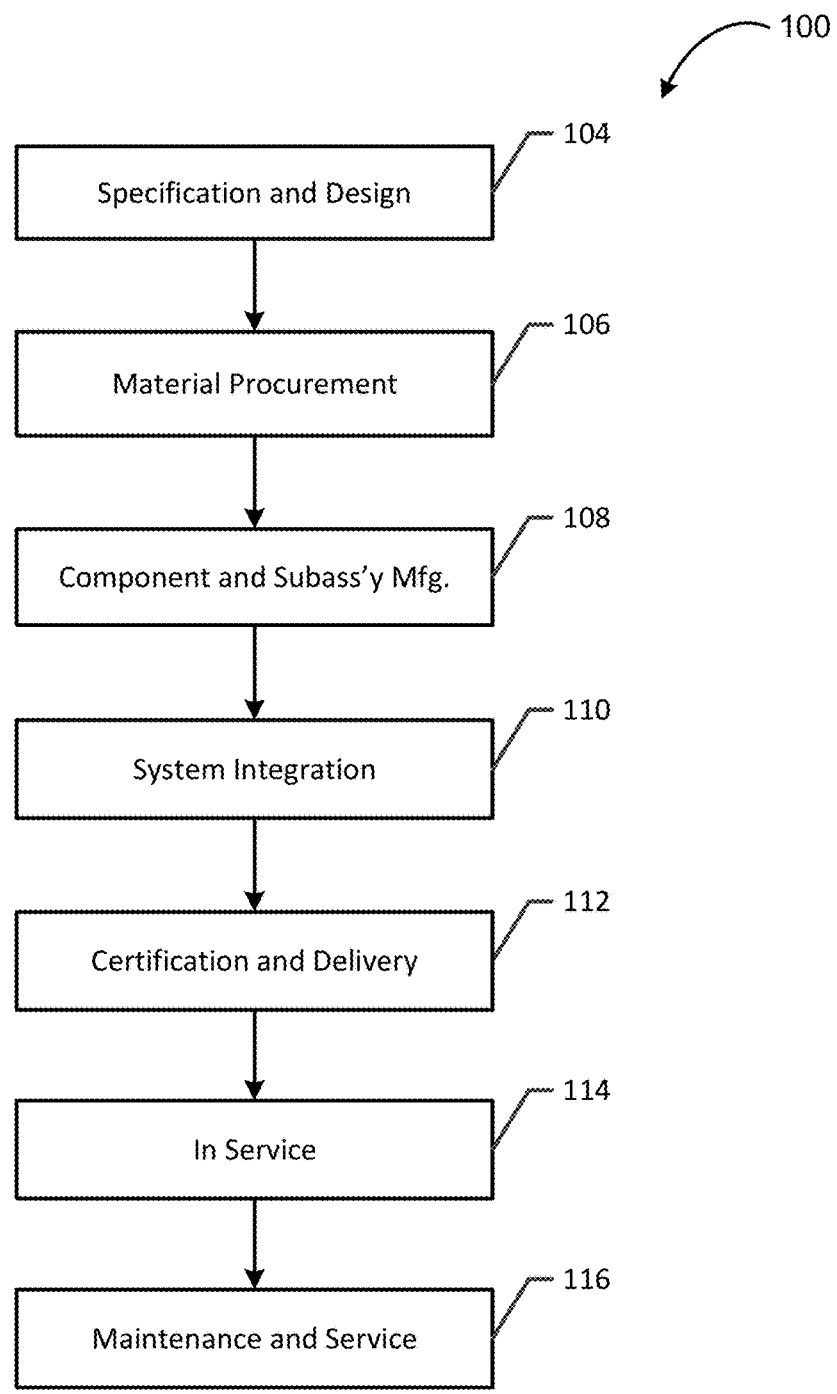

Having thus described certain example embodiments of the present disclosure in general terms, reference will hereinafter be made to the accompanying drawings, which are not necessarily drawn to scale, and wherein:

FIG. 1 depicts a stereoscopic camera having a pair of toed-in lenses in accordance with the prior art;

FIG. 2 depicts the images that suffer from keystone distortion that are presented for the left eye and the right eye by the stereoscopic imaging system of FIG. 1;

FIG. 3 illustrates a stereoscopic camera in accordance with an example embodiment of the present disclosure in which the first and second lenses are spaced apart by a first distance;

FIG. 4 depicts the images that are presented for the left eye and the right eye by the stereoscopic imaging system of FIG. 3;

FIG. 5 illustrates the stereoscopic camera of FIG. 3 in which the first and second lenses have been repositioned so as to be spaced apart by a second distance, smaller than the first distance;

FIG. 6 illustrates the stereoscopic camera of FIG. 3 in which the first and second lenses have been repositioned so as to be spaced apart by a second distance, greater than the first distance;

FIG. 7 depicts a singles image sensor having first and second portions for receiving optical signals from the first and second lenses, respectively, in accordance with another embodiment of the present disclosure;

FIG. 8 is a perspective view of a stereoscopic camera in accordance with an example embodiment of the present disclosure;

FIG. 9 is a flowchart showing operations performed in accordance with an example embodiment of the present disclosure;

FIG. 10 is a schematic representation of a visual telepresence system including a stereoscopic camera in accordance with an example embodiment of the present disclosure;

FIG. 11 is a flow diagram of aircraft production and service methodology; and

Figure 12:
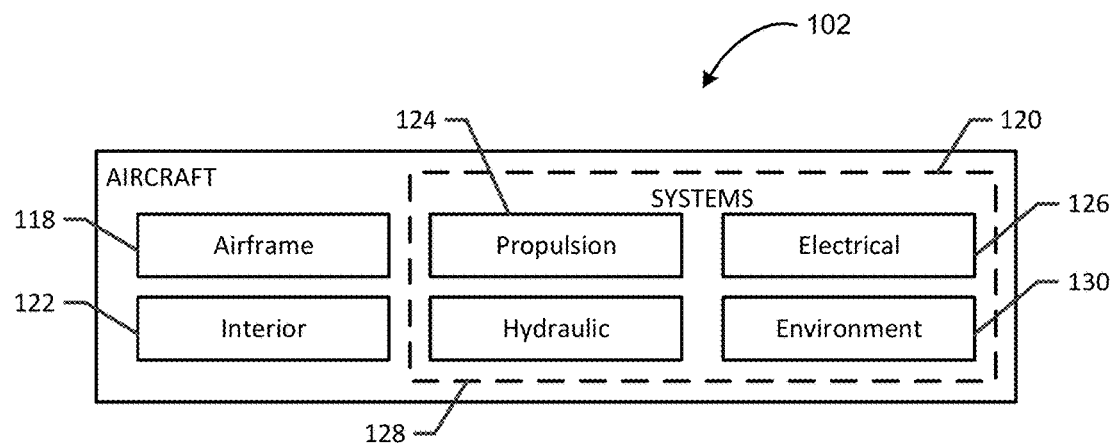

FIG. 12 is a block diagram of an aircraft.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A stereoscopic camera is provided in accordance with an example embodiment in order to capture stereoscopic image pairs that are geometrically correct and may be of high definition. The stereoscopic image pair that is captured in accordance with an example embodiment may be utilized in various applications including visual telepresence applications. For example, a user may reference the stereoscopic image pair in order to support remote navigation and positioning of an object, such as a stereoscopic camera for inspection purposes, or to conduct various manipulation tasks, such as may be performed remotely by robot or other end effector.

The stereoscopic camera of an example embodiment is configured such that the scale of the stereoscopic image pair may be adjusted, such as by being enlarged or reduced, while maintaining the geometrical relationship of the optical components of the stereoscopic camera. As such, geometric distortions that may otherwise cause fatigue, nausea and/or visual phoria of the user may be reduced or eliminated. Thus, the stereoscopic camera of an example embodiment supports various visual telepresence applications including those performed in a confined space as a result of the capability to reliably change the scale of the stereoscopic image pair in order to provide for the precise control that is required in a confined space.

A stereoscopic camera 10 in accordance with an example embodiment is depicted in FIG. 3. As shown, the stereoscopic camera 10 includes first and second lenses 12, 14, such as first and second flat field lenses. The first and second lenses 12, 14 define respective optical axes 16a, 16b that extend through the center of the respective lens and are oriented perpendicular to the plane of the respective lens. The first and second lenses 12, 14 of the stereoscopic camera 10 of an example embodiment are not toed-in, but are, instead configured such that the optical axis 16a of the first lens 12 is parallel to the optical axis 16b of the second lens 14.

The stereoscopic camera 10 also includes at least one image sensor 18 for receiving optical signals from the first and second lenses 12, 14. In the embodiment depicted in FIG. 3, the stereoscopic camera 10 includes first and second image sensors 18a, 18b for receiving optical signals from the first and second lenses 12, 14, respectively. As shown, the first and second image sensors 18a, 18b are coplanar, that is, first and second image sensors 18a, 18b lie within the same plane. The plane in which the first and second image sensors 18a, 18b lie is generally parallel to the plane in which the first and second lenses 12, 14 are positioned and perpendicular to the optical axes 16 of the first and second lenses 12, 14.

The first lens 12 and the first image sensor 18a define a first field of view 20. Likewise, the second lens 14 and the second image sensor 18b define a second field of view 22. As shown in FIG. 3, the first and second fields of view 20, 22 overlap to define a first area of coincidence 24 in the instance in which the first and second lenses 12, 14 are spaced apart by a first distance $d_1$, termed the interpupillary distance, as measured between the respective optical axes 16a, 16b. Thus, the stereoscopic image pair that is captured and presented to the left and right eyes of the user, such as upon a display, are represented by the first and second fields of view 20, 22 at the first area of coincidence 24. Thus, the images of the stereoscopic image pair that are presented to the left eye and the right eye are aligned with one another as shown in FIG. 4 as a result of the manner in which the first area of coincidence 24 is defined and do not experience geometric distortion, such as keystone distortions that may cause nausea, fatigue and/or visual phoria. The stereoscopic image pair therefore provides binocular depth cues without geometric distortions.

The first and second lenses 12, 14 of the stereoscopic camera 10 of an example embodiment are configured to be repositioned so as to be spaced apart by a second distance $d_2$, different than the first distance $d_1$, as measured between the respective optical axes 16. As shown in FIG. 5, the first and second lenses 12, 14 may be moved closer to one another such that the second distance $d_2$ is smaller than the first distance $d_1$. Alternatively, the first and second lenses 12, 14 may be repositioned so as to be further apart from one another as shown in FIG. 6 such that the second distance $d_2$ is greater than the first distance $d_1$. Regardless of whether the first and second lenses 12, 14 are repositioned toward or away from one another, the first and second image sensors 18a, 18b are also configured to be correspondingly repositioned to alter the spacing therebetween in response to the repositioning of the first and second lenses 12, 14 and, and in some embodiments, in concert with the repositioning of the first and second lenses 12, 14, as also shown in FIGS. 5 and 6.

As shown in FIG. 3, the first lens 12 and the first image sensor 18a are positioned relative to one another so as to define a predefined distance $D_1$ between the optical axis 16a of the first lens 12 and the center 19a of the first image sensor 18a. Likewise, the second lens 14 and the second image sensor 18b are positioned relative to one another to define a second predefined distance $D_2$, typically the same as the first predefined distance $D_1$, between the optical axis 16b of the second lens 14 and the center 19b of the second image sensor 18b. As shown in FIG. 3 the centers 19a, 19b of the first and second image sensors 18a, 18b are defined as the center 19a, 19b of that region of the image sensor 18a, 18b that receives optical signals from the respective image sensor 18a, 18b and need not necessarily be defined as the physical center 19a, 19b of the respective image sensor 18a, 18b.

The stereoscopic camera 10 of an example embodiment is configured such that the geometrical relationship of the first and second lenses 12, 14 and the first and second image sensors 18a, 18b remains the same as the first and second lenses 12, 14 and the first and second image sensors 18a, 18b are repositioned to alter the distance therebetween. In this regard, the first predefined distance $D_1$ between the optical axis 16a of the first lens 12 and the center 19a of the first image sensor 18a is the same in an instance in which the first and second lenses 12, 14 are spaced apart by a first distance $d_1$ as in an instance in which the first and second lenses 12, 14 are spaced apart by a second distance $d_2$. Likewise, the second predefined distance $D_2$ between the optical axis 16b of the second lens 14 and the center 19b of the second image sensor 18b remains the same in an instance in which the first and second lenses 12, 14 are spaced apart by a first distance $d_1$ as in an instance in which the first and second lenses 12, 14 are spaced apart by a second distance $d_2$. As a result, once the first and second lenses 12, 14 have been repositioned so as to be spaced apart by a second distance $d_2$, different than the first distance $d_1$, the first and second fields of view 20, 22 continue to overlap to define a second area of coincidence 26.

As shown in FIG. 5, a decrease in the interpupillary distance $d_2$ between the first and second lenses 12, 14 reduces the size and distance of the second area of coincidence 26 relative to the first area of coincidence 24. As a result, the scale of the resulting image when shown on the same viewing display is modified, such as by being enlarged, as a result of the reduction in the distance $d_2$ between the first and second lenses 12, 14. Conversely, repositioning of the first and second lenses 12, 14 as shown in FIG. 6 in order to increase the second distance $d_2$ relative to the first distance $d_1$ establishes a second area of coincidence 26 that is further from the first and second lenses 12, 14 and is larger than the first area of coincidence 24. Thus, the scale of the resulting stereoscopic image pair that is captured in response to an increase in the distance $d_2$ between the first and second lenses 12, 14 is reduced relative to the scale of the stereoscopic image pair captured in an instance in which the first and second lenses 12, 14 are spaced apart by the first distance $d_1$.

Although the stereoscopic camera 10 of the embodiment depicted in FIGS. 3, 5 and 6 includes first and second image sensors 18a, 18b, the stereoscopic camera 10 of another example embodiment may include a single image sensor 18 configured to receive optical signals from both the first and second lenses 12, 14. As shown in FIG. 7, the image sensor 18 of this embodiment includes a first portion 30 that receives the optical signals from the first lens 12 and a second portion 32 that receives the optical signals from the second lens 14 in an instance in which the first and second lenses 12, 14 are separated by the first distance $d_1$. When the first and second lenses 12, 14 are repositioned, however, so as to be separated by a second distance $d_2$, different than the first distance $d_1$, the first portion 30 of the image sensor 18 that receives the optical signals from the first lens 12 and the second portion 32 of the image sensor that receives the optical signals from the second lens 14 are correspondingly repositioned. In this regard, the distance between the optical axis 16a of the first lens 12 and the center of the first portion 30 of the image sensor 18 that receives the optical signals from the first lens 12 remains the same in an instance when the first and second lenses 12, 14 are spaced apart by the first distance $d_1$ and by the second distance $d_2$. Similarly, the distance between the optical axis 16b of the second lens 14 and the center of the second portion 32 of the image sensor 18 that receives the optical signals from the second lens 14 remains the same in an instance when first and second lenses 12, 14 are spaced apart by the first distance $d_1$ and also by the second distance $d_2$.

By way of illustration, FIG. 7 depicts the first portion 30 of the image sensor 18 that receives optical signals from the first lens 12 in an instance in which the first and second lenses 12, 14 are spaced apart by the first distance $d_1$—(not shown in FIG. 7) in solid lines. After repositioning the first and second lenses 12, 14 to be spaced apart by the second distance $d_2$, the first portion 30 of the image sensor 18 that receives optical signals from the first lens 12 is correspondingly repositioned as shown in dashed lines. Similarly, the second portion 32 of the image sensor 18 that receives optical signals from the second lens 14 in an instance in which the first and second lenses 12, 14 are spaced apart by the first distance $d_1$ is depicted in solid lines, while after repositioning the first and second lenses 12, 14 to be spaced apart by the second distance $d_2$ (not shown in FIG. 7), the second portion 32 of the image sensor 18 that receives optical signals from the second lens 14 is correspondingly repositioned as shown in dashed lines. The first and second portions 30, 32 of the image sensor 18 may be repositioned in various manners. In an example embodiment, however, a controller 34, such as a processor or other computing device, is configured to identify those portions, namely, the first and second portions 30, 32, of the image sensor 18 that are to be read in order to capture the first and second stereoscopic image pairs.

The stereoscopic camera 10 may be configured in various manners in order to facilitate movement of the first and second lenses 12, 14 so as to alter the spacing therebetween while maintaining the geometrical relationship of the optical components of the stereoscopic camera 10. As shown in FIG. 8, the stereoscopic camera 10 of an example embodiment includes a housing 40 and one or more rails 42, such as a plurality of rails 42 extending in parallel through the housing 40. For purposes of illustration, the housing 40 is depicted in FIG. 8 to be partially translucent such that the internal components are visible. In other embodiments, however, the housing is opaque. The first and second lenses 12, 14 are slidably mounted upon one or more of the rails 42, such as upon a pair of the rails 42. The first and second lenses 12, 14 are slidably mounted upon the rails 42, such as by slidable clips 43, such that the optical axes 16a, 16b defined by the first and second lenses 12, 14 extend perpendicularly to the rails 42.

The stereoscopic camera 10 of this example embodiment is configured such that the first and second lenses 12, 14 may be controllably slidably repositioned along the one or more rails 42 so as to be spaced apart by the first and second distances $d_1$, $d_2$ while maintaining the parallel relationship of the optical axes 16a, 16b. In an instance in which the second distance $d_2$ is greater than the first distance $d_1$, the first and second lenses 12, 14 are slidably separated from one another along the one or more rails 42, while in an instance in which the second distance $d_2$ is smaller than the first distance $d_1$, the first and second lenses 12, 14 are slidably repositioned toward one another. In an example embodiment, the first and second lenses 12, 14 are slidably repositioned by moving each of the first and second lenses 12, 14 by equal amounts in opposite directions. However, in other embodiments, the first and second lenses 12, 14 are slidably repositioned in different amounts and, in some embodiments, only one of the first and second lenses 12, 14 is configured to be repositioned.

In an instance in which the stereoscopic camera 10 includes a single image sensor 18, the image sensor may not be physically repositioned in response to the repositioning of the first and second lenses 12, 14. However, the first and second portions 30, 32 of the image sensor 18 that receive the optical signals from the first and second lenses 12, 14, respectively, are redefined, such as by the controller 34, in order to be correspondingly repositioned in order to maintain the same geometric relationship between the first and second lenses 12, 14 and the first and second portions 30, 32 of the image sensor 18 as described above. In an embodiment, however, in which the stereoscopic camera 10 includes first and second image sensors 18a, 18b, the first and second image sensors 18a, 18b are also slidably mounted upon one or more of the rails 42, such as upon another pair of the rails 42 as also shown in FIG. 8. The first and second image sensors 18a, 18b of this example embodiment are configured to be slidably repositioned in concert with the first and second lenses 12, 14. In this regard, the first lens 12 and the first image sensor 18a are configured to move in concert by moving in the same direction and by the same distance, while the second lens 14 and the second image sensor 18b are configured to move in concert by moving in the same direction and by the same distance. As a result of the slidable mounting of the first and second lenses 12, 14 and first and second image sensors 18a, 18b upon the plurality of parallel rails 42, the slidable repositioning of the first and second lenses 12, 14 and the first and second image sensors 18a, 18b along the rails 42 facilities the maintenance of the geometric relationship therebetween.

The stereoscopic camera 10 may be configured to slidably reposition the first and second lenses 12, 14 along the one or more rails 42 in various manners. In an example embodiment, however, the stereoscopic camera 10 includes a motor 44, such as a screw motor, configured to slidably reposition the first and second lenses 12, 14 and, in an example embodiment, the first and second image sensors 18a, 18b, along the rails 42. In this regard, the motor 44 is configured to slidably reposition the first and second lenses 12, 14 and, in an example embodiment, the first and second image sensors 18a, 18b in a direction and by a distance that are defined by control signals provided, such as by the controller 34, in response to user input. The stereoscopic camera 10 of an example embodiment may also include one or more sensors for identifying the location of the first and second lenses 12, 14 and for providing feedback to the controller 34 to permit the controller 34 to position the first and second lenses 12, 14 and, in some embodiments, the first and second image sensors 18a, 18b in the desired positions. The stereoscopic camera 10 may include a plurality of screw motors, one if which is associated with each of the movable components, namely, the first and second lenses 12, 14 and the first and second image sensors 18a, 18b. Alternatively, the stereoscopic camera 10 may include a fewer number of screw motors, such as a first screw motor to controllably position the first lens 12 and the first image sensor 18a and a second screw motor to controllably position the second lens 14 and the second image sensor 18b. Still further, the stereoscopic camera 10 of another embodiment may include a single screw motor configured to move the first lens 12 and the first image sensor 18a relative to the second lens 14 and the second image sensor 18b, such as in equal and opposite directions.

The operations performed in order to vary the scale of stereoscopic image pair are depicted in FIG. 9. In this regard, the stereoscopic camera 10 captures a first stereoscopic image pair at first scale with at least one image sensor 18 based upon optical signals received from first and second lenses 12, 14 that are spaced apart by a first distance $d_1$. See block 50 of FIG. 9. In order to vary the scale of the resulting stereoscopic image pair, the first and second lenses 12, 14 are repositioned so as to be spaced apart by a second distance $d_2$, different than the first distance $d_1$. See block 52 of FIG. 9. As described above, however, the geometric relationship of the optical components of the stereoscopic camera 10 remains the same while the first and second lenses 12, 14 are spaced apart by the first distance $d_1$ and by the second distance $d_2$. A second stereoscopic image pair is then captured at the second scale, different than the first scale, while the first and second lenses 12, 14 are spaced apart by the second distance $d_2$. See block 54 of FIG. 9. The second scale may be enlarged relative to the first scale an instance in which the first and second lenses 12, 14 are spaced closer together with the second distance $d_2$ being less than the first distance $d_1$. Alternatively, the second scale may be reduced relative to the first scale in an instance in which the first and second lenses 12, 14 are moved away from one another with the second distance $d_2$ being larger than the first distance $d_1$. Various actions may be taken based upon a review of the first and second stereoscopic image pairs of different scales. As shown in block 56 of FIG. 9, for example, control may be provided over an object based on the second stereoscopic image pair at the second scale.

As a result of the reduction or elimination in geometric distortion and the capability of capturing a stereoscopic image pair at various scales, the stereoscopic camera 10 of an example embodiment is capable of being utilized in various applications including visual telepresence applications. In this regard, a user may be located remotely from a workpiece or a workspace. However, the stereoscopic camera 10 of this example embodiment is positioned within the workspace so as to capture images of the workpiece. As such, the user may view the images in order to inspect the workpiece, monitor ongoing work or the like. As a result of the reduction or elimination of geometric distortion, the user may view the stereoscopic image and suffer less nausea, fatigue, and/or visual phoria.

As described above, the user may direct the stereoscopic camera 10 to capture the stereoscopic image pair at different scales, such as an enlarged scale or a reduced scale by controllably changing the distance between the first and second lenses 12, 14 without altering the geometric relationship of the stereoscopic camera 10. As a result of the capability of obtaining the stereoscopic image pair at different scales, the user may provide control over an object within a remote workspace, such as repositioning the stereoscopic camera 10 relative to the workpiece or controllably manipulating an object within a remote workspace, such as by controlling the movement of a robotic arm or other end effector. Consequently, the stereoscopic camera 10 and associated method may support various visual telepresence applications, such as for manufacturing, inspection or the like. As more specific examples, the stereoscopic camera 10 and associated method may support the use of visual telepresence for the inspection or manufacturing of an aircraft, such as the crown of an aircraft, for inspection and rescue in confined spaces such as collapsed buildings, for planetary geological prospecting, and for other variable scale telepresence applications to name but a few.

By way of example, FIG. 10 depicts a visual telepresence application that may benefit from use of the stereoscopic camera 10. In this regard, the stereoscopic camera 10 may be mounted upon a workpiece, such as the fuselage 60 of an aircraft. In another example embodiment, the stereoscopic camera may be carried by a robot, such as an end effector or the robot, which controllably travels along the workpiece, such as the fuselage 60. The stereoscopic camera 10 is configured to capture a stereoscopic image pair of a portion of the fuselage 60 at a desired scale. The stereoscopic image pair 64 is provided in accordance with this example embodiment to a user 66 for presentation upon a display 62, such as a stereoscopic display. The display 62 of an example embodiment is configured to present alternating perspectives of overlapping images captured by the first and second image sensors 18a, 18b of the first and second fields of view 20, 22, respectively, to respective eyes of a viewer, such as the user 66. When the images captured by the first and second image sensors 18a, 18b are presented on a single display surface, such as a stereoscopic video monitor, the images, ideally, overlap completely, thus they are inherently coincident. The user's view of the images is generally controlled such that the left eye is only allowed to see the left image, e.g., the image captured by the first image sensor 18a, and the right eye is only allowed to see only the right image, e.g., the image captured by the second image sensor 18b. For example, the user 66 may wear shutter glasses with alternate eyes shuttered as alternate images are displayed. Alternatively, the display 62 may be a barrier or lenticular autostereoscopic display that requires the user 66 to remain in a position that ensures the left or right eyes see only the vertical image stripes that represent each of the left or right images. However, in an instance in which the display 62 is a head-mounted display, the display 62 of an example embodiment includes two separate display screens or one display screen with two display areas that insert optical elements between the user's eyes and the displays to make the displays appear at a virtual distance from the user's eyes and aligned to be coincident. The forgoing display techniques are geometrically equivalent, that is, two images being presented overlayed on one physical display screen or two images being presented on two display screens that appear virtually at the same location in space.

The user 66 is generally is positioned relative to the display 62 such that the user's eyes are a distance away from the screen on which the stereoscopic image pairs are reproduced with the distance being equivalent to the distance of the camera from the first area of coincidence 24 when the first interpupilary distance $d_1$ is equal to the interpupilary distance of the user's eyes. When the stereoscopic camera 10 is set at a second interpupilary distance $d_2$ and is moved to bring the second area of coincidence 26 to the same subject, the user 66 does not change distance from the viewing screen. The subject that is in the camera area of coincidence appears at the second scale and remains geometrically correct, that is the subject appears scaled in all dimensions. As this example demonstrates, the geometry of the user 66 gazing at the display 62 has the same field of view as the stereoscopic camera 10, that is, the same angle of view. And, the area of coincidence of the stereoscopic camera 10 is what is displayed on the surface of the display 62, thereby filling the display 62.

The user 66 may therefore monitor or inspect the fuselage 60 from a remote location by studying the stereoscopic image pair 64. The user 66 may provide feedback, such as via a user input device 68, to change the scale of the stereoscopic image pair 64, such as by causing the stereoscopic image pair 64 to be enlarged or reduced to facilitate the inspection of the fuselage 60. In an example embodiment, the controller 34 is responsive to the user input device 68 to as to controllably reposition the first and second lenses 12, 14 relative to one another in order to alter the scale in the desired fashion. In addition, the user 66 can provide input, such as via the user input device 68, to cause the stereoscopic camera 10 to be relocated relative to the fuselage 60 to permit inspection of other portions of the fuselage 60.

As described in conjunction with the visual telepresence application of FIG. 10, embodiments of the disclosure may be utilized in the context of an aircraft manufacturing and service method 100 as shown in FIG. 11 and an aircraft 102 as shown in FIG. 12. During pre-production, exemplary method 100 may include specification and design 104 of the aircraft 102 and material procurement 106. During the production process, component and subassembly manufacturing 108 and system integration 110 of the aircraft 102 takes place which may include the use of visual telepresence utilizing the stereoscopic camera 10 in order to inspect the aircraft and/or monitor its manufacture. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on). In conjunction with the maintenance and service 116, visual telepresence utilizing the stereoscopic camera 10 may again be employed in order to inspect the aircraft and/or monitor the maintenance and service operations performed thereupon.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100, such as those described above. For example, components or subassemblies corresponding to production process may be fabricated or manufactured in a manner similar to components or subassemblies produced while the aircraft 102 is in service. Also, one or more apparatus embodiments, method embodiments, or a combination thereof may be utilized during the production stages, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed is:

1. A stereoscopic camera comprising:
   first and second lenses defining respective optical axes with the optical axis of the first lens parallel to the optical axis of the second lens; and
   first and second image sensors configured to receive optical signals from the first and second lenses, respectively, the first and second image sensors being coplanar and perpendicular to the optical axis of the respective lens,
   the first lens and the first image sensor defining a first field of view and the second lens and the second image sensor defining a second field of view,
   the first and second fields of view overlapping to define a first area of coincidence in an instance in which the first and second lenses are spaced apart by a first distance,
   the first and second lenses are configured to be repositioned so as to be spaced apart by a second distance, different than the first distance, and the first and second image sensors are configured to be correspondingly repositioned to alter a spacing therebetween such that the first and second fields of view overlap to define a second area of coincidence in an instance in which the first and second lenses are spaced apart by the second distance.

2. A stereoscopic camera according to claim 1 wherein the first and second lenses and the first and second image sensors are configured to be repositioned such that a distance between the optical axis of the first lens and a center of the first image sensor remains the same and a distance between the optical axis of the second lens and a center of the second image sensor remains the same while the first and second lenses are spaced apart by the first distance and by the second distance.

3. A stereoscopic camera according to claim 1 further comprising one or more rails upon which the first and second lenses are slidably mounted, wherein the first and second lenses are configured to be slidably repositioned along the one or more rails so as to be spaced apart by the first and second distances while maintaining a parallel relationship of the optical axes.

4. A stereoscopic camera according to claim 3 wherein the one or more rails comprise a plurality of rails extending in parallel with one another, wherein the first and second image sensors are slidably mounted upon one or more of the rails and are configured to be slidably repositioned in concert with the first and second lenses, respectively.

5. A stereoscopic camera according to claim 3 further comprising a motor configured to slidably reposition the first and second lenses along the one or more rails.

6. A stereoscopic camera according to claim 1 further comprising a display configured to present alternating perspectives of overlapping images captured by the first and second image sensors of the first and second fields of view, respectively, to respective eyes of a viewer.

7. A stereoscopic camera comprising:
   first and second lenses defining respective optical axes with the optical axis of the first lens parallel to the optical axis of the second lens; and at least one image sensor configured to receive optical signals from the first and second lenses, the first lens and the at least one image sensor defining a first field of view and the second lens and the at least one image sensor defining a second field of view, the first and second fields of view overlapping to define a first area of coincidence in an instance in which the first and second lenses are spaced apart by a first distance, the first and second lenses are configured to be repositioned so as to be spaced apart by a second distance, different than the first distance, and a distance between the optical axis of the first lens and a center of that portion of the at least one image sensor that receives the optical signals from the first lens remains the same and a distance between the optical axis of the second lens and a center of that portion of the at least one image sensor that receives the optical signals from the second lens remains the same while the first and second lenses are spaced apart by the first distance and by the second distance such that the first and second fields of view overlap to define a second area of coincidence in an instance in which the first and second lenses are spaced apart by the second distance.

8. A stereoscopic camera according to claim 7 wherein the at least one image sensor comprises a single image sensor including first and second portions for receiving optical signals from the first and second lenses, respectively.

9. A stereoscopic camera according to claim 8 wherein the at least one image sensor is configured to reposition the first and second portions in response to repositioning of the first and second lenses such that the distance between the optical axis of the first lens and the center of the first portion of the image sensor remains the same and the distance between the optical axis of the second lens and the center of the second portion of the image sensor remains the same while the first and second lenses are spaced apart by the first distance and by the second distance.

10. A stereoscopic camera according to claim 7 wherein the at least one image sensor comprises first and second image sensors that are configured to be correspondingly repositioned to alter a spacing therebetween in response to repositioning of the first and second lenses.

11. A stereoscopic camera according to claim 10 wherein the first and second image sensors are coplanar.

12. A stereoscopic camera according to claim 7 further comprising one or more rails upon which the first and second lenses are slidably mounted, wherein the first and second lenses are configured to be slidably repositioned along the one or more rails so as to be spaced apart by the first and second distances while maintaining a parallel relationship of the optical axes.

13. A stereoscopic camera according to claim 12 further comprising a motor configured to slidably reposition the first and second lenses along the one or more rails.

14. A stereoscopic camera comprising:
first and second lenses defining respective optical axes with the optical axis of the first lens parallel to the optical axis of the second lens;
first and second image sensors for receiving optical signals from the first and second lenses, respectively, the first and second image sensors being coplanar and perpendicular to the optical axis of the respective lens; and
a controller configured to cause the first and second lenses to be repositioned such that the optical axes of the first and second lenses are spaced apart by a different distance while maintaining a parallel relationship of the optical axes of the first and second lenses.

15. A stereoscopic camera according to claim 14 further comprising one or more rails upon which the first and second lenses are slidably mounted.

16. A stereoscopic camera according to claim 15 wherein the first and second lenses are configured to be slidably repositioned along the one or more rails so as to be spaced apart by a different distance while maintaining the parallel relationship of the optical axes.

17. A stereoscopic camera according to claim 15 wherein the one or more rails comprise a plurality of rails extending in parallel with one another, wherein the first and second image sensors are slidably mounted upon one or more of the rails and are configured to be slidably repositioned in concert with the first and second lenses, respectively.

18. A stereoscopic camera according to claim 14 wherein the first and second image sensors are configured to be correspondingly repositioned to alter a spacing therebetween based upon the repositioning of the first and second lenses.

19. A stereoscopic camera according to claim 14 further comprising a motor configured to reposition the first and second lenses.

20. A stereoscopic camera according to claim 14 wherein the first lens and the first image sensor define a first field of view and the second lens and the second image sensor define a second field of view, and
wherein the first and second fields of view overlap to define a first area of coincidence in an instance in which the first and second lenses are spaced apart by a first distance.

21. A stereoscopic camera according to claim 20 wherein the first and second lenses are configured to be repositioned so as to be spaced apart by a second distance, different than the first distance, and wherein the first and second image sensors are configured to be correspondingly repositioned to alter a spacing therebetween such that the first and second fields of view overlap to define a second area of coincidence in an instance in which the first and second lenses are spaced apart by the second distance.

22. A stereoscopic camera according to claim 20 wherein the first and second lenses are configured to be repositioned so as to be spaced apart by a second distance, different than the first distance, wherein a distance between the optical axis of the first lens and a center of the first image sensor remains the same and a distance between the optical axis of the second lens and a center of the second image sensor remains the same while the first and second lenses are spaced apart by the first distance and by the second distance such that the first and second fields of view overlap to define a second area of coincidence in an instance in which the first and second lenses are spaced apart by the second distance.

23. A method of varying a scale of a stereoscopic image pair, the method comprising:
capturing a first stereoscopic image pair at a first scale with at least one image sensor based upon optical signals received from first and second lenses that are spaced apart by a first distance, the first and second lenses defining respective optical axes with the optical axis of the first lens parallel to the optical axis of the second lens;
repositioning the first and second lenses so as to be spaced apart by a second distance, different than the first distance, while maintaining a parallel relationship of the optical axes of the first and second lenses; and capturing a second stereoscopic image pair at a second scale, different than the first scale, while the first and second lenses are spaced apart by the second distance.

24. A method according to claim 23 wherein the first lens and the at least one image sensor define a first field of view and the second lens and the at least one image sensor define a second field of view, and wherein the first and second fields of view overlap to define a first area of coincidence in an instance in which the first and second lenses are spaced apart by the first distance.

25. A method according to claim 24 wherein a distance between the optical axis of the first lens and a center of that portion of the at least one image sensor that receives the optical signals from the first lens remains the same and a distance between the optical axis of the second lens and a center of that portion of the at least one image sensor that receives the optical signals from the second lens remains the same while the first and second lenses are spaced apart by the first distance and by the second distance such that the first and second fields of view overlap to define a second area of coincidence in an instance in which the first and second lenses are spaced apart by the second distance.

26. A method according to claim 23 wherein the second scale is enlarged relative to the first scale, and wherein the method further comprises providing control over an object based upon the second stereoscopic image pair at the second scale.

27. A method according to claim 26 wherein providing control comprises controlling a position of the object from a remote location based upon the second stereoscopic image pair at the second scale.

28. A method according to claim 23 wherein the second scale is reduced relative to the first scale, and wherein the method further comprises providing control over an object based upon the second stereoscopic image pair at the second scale.

29. A method according to claim 23 wherein repositioning the first and second lenses comprises slidably repositioning the first and second lenses along one or more rails upon which the first and second lenses are slidably mounted so as to be spaced apart by a different distance while maintaining the parallel relationship of the optical axes.

30. A method according to claim 23 wherein the at least one image sensor comprises first and second image sensors, and wherein the method further comprises correspondingly repositioning the first and second image sensors to alter a spacing therebetween in response to repositioning of the first and second lenses.

* * * * *